United States Patent
Hayashi (10) Patent No.: US 7,565,512 B2
(45) Date of Patent: Jul. 21, 2009

(54) METHOD, SYSTEM AND APPARATUS FOR GENERATION OF GLOBAL BRANCH HISTORY

(75) Inventor: Hiroo Hayashi, Austin, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 252 days.

(21) Appl. No.: 11/701,720

(22) Filed: Feb. 2, 2007

(65) Prior Publication Data

US 2008/0189533 A1    Aug. 7, 2008

(51) Int. Cl.
G06F 9/38    (2006.01)
(52) U.S. Cl. .................................... 712/220; 712/240
(58) Field of Classification Search ............... 712/220, 712/240
See application file for complete search history.

(56) References Cited

U.S. PATENT DOCUMENTS

| | | | | |
|---|---|---|---|---|
| 5,872,950 | A * | 2/1999 | Levitan et al. | 712/217 |
| 6,223,280 | B1 * | 4/2001 | Horton et al. | 712/240 |
| 6,550,004 | B1 * | 4/2003 | Henry et al. | 712/239 |
| 6,598,152 | B1 | 7/2003 | Sinharoy | |
| 6,745,323 | B1 * | 6/2004 | Sinharoy | 712/240 |
| 2004/0088472 | A1 * | 5/2004 | Nystuen et al. | 711/5 |
| 2005/0125646 | A1 * | 6/2005 | Yokoi | 712/239 |

FOREIGN PATENT DOCUMENTS

JP    P2005-100403    4/2005

OTHER PUBLICATIONS

Seznec, A. etal., Design tradeoffs for the Alpha EV8 conditional Branch predictor, 2002, IEEE, 12 pages.*
McFarling, Scott, "WRL Technical Note TN-36," Western Research Laboratory, Palo Alto, California, pp. 1-25, Jun. 1993.

* cited by examiner

Primary Examiner—Eric Coleman
(74) Attorney, Agent, or Firm—Sprinkle IP Law Group (57) ABSTRACT

Systems, methods and apparatuses for the generation of a global history are disclosed. Embodiments of the present invention may provide logic operable to generate a global history and a global history register operable to store a global history. More specifically, in one embodiment the global history logic comprises a set of multiplexers, each set corresponding to one of a set of instructions fetched in a cycle of a microprocessor, the number of multiplexers in each set equal to the number of bits of global history and each multiplexer within a set having a select signal corresponding to the same instruction to which that set of multiplexers corresponds.

22 Claims, 6 Drawing Sheets

METHOD, SYSTEM AND APPARATUS FOR GENERATION OF GLOBAL BRANCH HISTORY

TECHNICAL FIELD OF THE INVENTION

The invention relates in general to methods and systems for microprocessors, and more particularly, to the generation of branch history for branch prediction in a pipelined microprocessor.

BACKGROUND OF THE INVENTION

In recent years, there has been an insatiable desire for faster computer processing data throughputs because cutting-edge computer applications are becoming more and more complex. This complexity commensurately places ever increasing demands on microprocessing systems. The microprocessors in these systems have therefore been designed with hardware functionality intended to speed the execution of instructions.

One example of such functionality is a pipelined architecture. In a pipelined architecture instruction execution overlaps, so even though it might take five clock cycles to execute each instruction, there can be five instructions in various stages of execution simultaneously. That way it looks like one instruction completes every clock cycle.

Additionally, many modern processors have superscalar architectures. In these superscalar architectures, one or more stages of the instruction pipeline may be duplicated. For example, a microprocessor may have multiple instruction decoders, each with its own pipeline, allowing for multiple instruction streams, which means that more than one instruction can complete during each clock cycle.

Techniques of these types, however, may be quite difficult to implement. In particular, pipeline hazards may arise. Pipeline hazards are situations that prevent the next instruction in an instruction stream from executing during its designated clock cycle. In this case, the instruction is said to be stalled. When an instruction is stalled, typically all instructions following the stalled instruction are also stalled. While instructions preceding the stalled instruction can continue executing, no new instructions may be fetched during the stall.

Pipeline hazards, in main, consist of three main types. Structural hazards, data hazards and control hazards. Structural hazards occur when a certain processor resource, such as a portion of memory or a functional unit, is requested by more than one instruction in the pipeline. A data hazard is a result of data dependencies between instructions. For example, a data hazard may arise when two instructions are in the pipeline where one of the instructions needs a result produced by the other instruction. Thus, the execution of the first instruction must be stalled until the completion of the second instruction. Control hazards may arise as the result of the occurrence of a branch instruction. Instructions following the branch instruction must usually be stalled until it is determined which branch is to be taken.

With respect to control hazards, many software techniques, which may be for example implemented through use of a compiler, have been developed to reduce these control hazards. These software solutions have proved less than ideal, as multiple architecture implementations with different pipelining and superscalar choices may make these software implementations difficult to implement.

To that end, hardware or hardware/software solutions have been developed In order to deal with these control hazards. In particular, branch prediction may be utilized to predict if a branch instruction in an instruction pipeline such will be taken and fetching the instructions associated with the prediction. As branch instructions flow through the pipeline, and ultimately execute, the actual outcome of the branches are determined. At that point, if the predictions were found to be correct, the branch instructions are simply completed like all other instructions. In the event that a prediction is found to be incorrect, the instruction fetch logic causes the mispredicted instructions to be discarded and starts refetching instructions along the corrected path.

In other words if the prediction is correct there is no need to insert bubbles in the pipeline and the instruction pipeline remain full. If, however, the branch prediction is wrong a heavy penalty must be paid, as the instruction pipeline must be flushed and instructions associated with the other branch fetched.

As a result of the potential gains in speed which result from accurate branch prediction (and the commensurate penalty imposed by poor branch prediction) hardware branch prediction strategies have been extensively studied. The most well known technique, referred to here as bimodal branch prediction, makes a prediction based on the direction the branch went the last few times it was executed. More recent work has shown that significantly more accurate predictions can be made by utilizing more branch history. One method considers the history of each branch independently and takes advantage of repetitive patterns. Since the histories are independent, we will refer to it as local branch prediction. Another technique uses the combined history of all recent branches in making a prediction. This technique will be referred to as global branch prediction. Each of these different branch prediction strategies has distinct advantages. The bimodal technique works well when each branch is strongly biased in a particular direction. The local technique works well for branches with simple repetitive patterns. The global technique works particularly well when the direction taken by sequentially executed branches is highly correlated.

Some techniques allow different types of branch predictors to be combined. The technique uses multiple branch predictors and selects the one which is performing best for each branch. This approach has been shown to provide more accurate predictions than any one predictor alone, however, this combined approach may require a branch history table (BHT) to be kept for local branch prediction while also requiring that a global branch history be generated for global branch prediction. This requirement may in turn necessitate a relatively large amount of logic.

In pipelined architectures, multiple instructions are fetched simultaneously, thus in one fetch there may be multiple branch instructions which may, in turn, each need to be recorded in a global branch history. In order to do generate this global branch history for these multiple instructions a relatively large number of logic gates may need to be utilized. Not only does utilizing a large number of logic gates consume extra area on a semiconductor device, but additionally, as the logic becomes more complex it is difficult to meet the timing requirements of this logic to be paired with certain. pipelined architectures Thus, a need exists for efficient systems and methods for the generation of branch history which may be utilized in a pipelined microprocessor architecture and reduce the overhead of branch history generation.

SUMMARY OF THE INVENTION

Systems, methods and apparatuses for the generation of a global history are disclosed. Embodiments of the present invention may provide logic operable to generate a global history and a global history register operable to store a global history. More specifically, in one embodiment the global history logic comprises a set of multiplexers, each set corresponding to one of a set of instructions fetched in a cycle of a microprocessor, the number of multiplexers in each set equal to the number of bits of global history and each multiplexer within a set having a select signal corresponding to the same instruction to which that set of multiplexers corresponds.

In one embodiment, a global history register is operable to store a first set of bits and global history generation logic is operable to generate a set of global history bits, the global history logic comprising: a plurality of sets of multiplexers, each set of multiplexers corresponding to one of a set of instructions fetched during a cycle, wherein each multiplexer in a set of multiplexers has a select signal coupled to a bit of a signal line corresponding to the one of the set of instructions to which the set of multiplexers corresponds, the plurality of sets of multiplexers including a first set of multiplexers comprising a first multiplexer having a first input coupled to a first bit of a branch history signal corresponding to the one of the set of instructions to which the first set of multiplexers corresponds and a second input coupled to a first bit of the global history register.

In another embodiment, the first bit of the branch history signal corresponds to a branch history generated for the one of the set of instructions to which the first set of multiplexers corresponds.

In other embodiments, a second set of multiplexers corresponds to one of the set of global history bits wherein one input of each multiplexer corresponds to a global history bit generated by the global history logic and a select signal of the multiplexer is a mispredict signal operable to indicate that a branch instruction has been mispredicted.

Embodiments of the present invention may provided the technical advantage that global history may be generated in fewer cycles, resulting in less delay in the generation of global history and subsequent processing.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Figure 1:
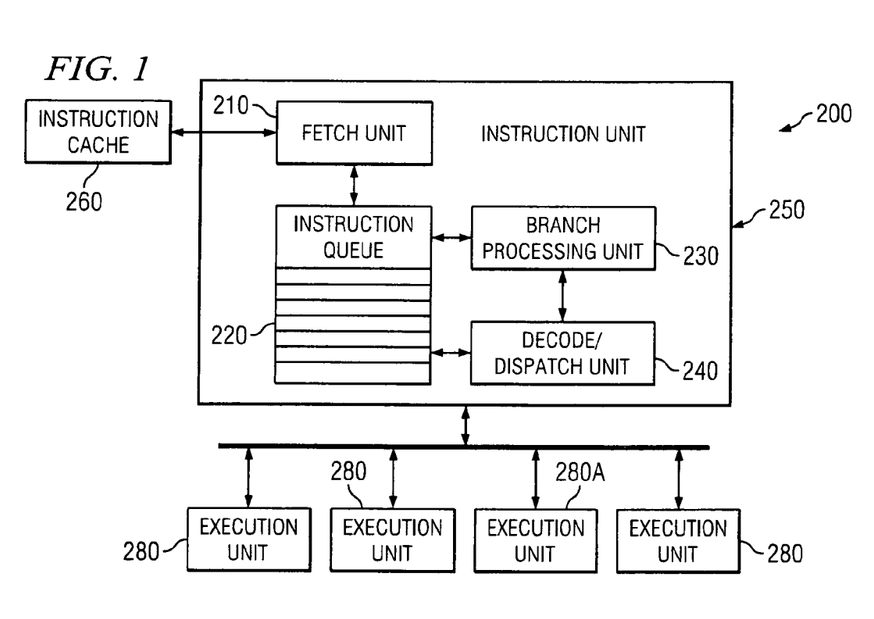
FIG. 1 includes a block diagram of one embodiment of a microprocessor.

Before describing embodiments of the present invention, however, it may be useful to describe an embodiment of an exemplary microprocessor architecture which may be useful in describing embodiments of the present invention. FIG. 1 includes a block diagram of a microprocessor 200. Microprocessor 200 may be pipelined and multi-threaded, and include instruction unit 250 and execution units 280. Instruction unit 250, in turn, includes fetch unit 210, decode/dispatch unit 240, instruction queue 220 and branch processing unit 230.

Fetch unit 210 may supply instructions to instruction queue 220 by accessing instruction cache 260 using the address of the next instruction or an address supplied by branch processing unit 230 when a branch is resolved or predicted. Fetch unit 210 may fetch four sequential instructions from instruction cache 260 and provides these instructions to an eight word instruction queue 220. These instructions may have an order of execution wherein a instruction in the set of instructions which is supposed to be executed before another instruction in the set of instructions may be referred to as a previous instruction.

Instructions from instruction queue 220 are decoded and dispatched to the appropriate execution unit 280 by decode/dispatch unit 240. In many cases, decode/dispatch unit 240 provides the logic for decoding instructions and issuing them to the appropriate execution unit 280. In one particular embodiment, an eight entry instruction queue 220 consists of two four entry queues, a decode queue and a dispatch queue. Decode logic of decode/dispatch unit 240 decodes the four instruction in the decode queue, while the dispatch logic of decode/dispatch unit 240 evaluates the instructions in the dispatch queue for possible dispatch, and allocates instructions to the appropriate execution unit 280. In a multi-threaded implementation of microprocessor 200, decode/dispatch unit 240 may also be responsible for switching between threads and determining if instructions are available for a particular thread.

Execution units 280 are responsible for the execution of different types of instruction issued from dispatch logic of decode/dispatch unit 240. Execution units 280 may include a branch execution unit 280a and a series of arithmetic execution units. Branch execution unit 280*a* may be operable to execute branch instructions, determine if a branch instruction has been mispredicted, and determine a correct global history. These execution units 280 may include single cycle integer units responsible for executing integer instructions. A floating point unit may be responsible for executing single and double precision floating point operations, while a load store execution unit may transfer data between a cache and a results bus, route data to other execution units, and transfer data to and from system memory. The load store unit may also support cache control instructions and load/store instructions.

Figure 2:
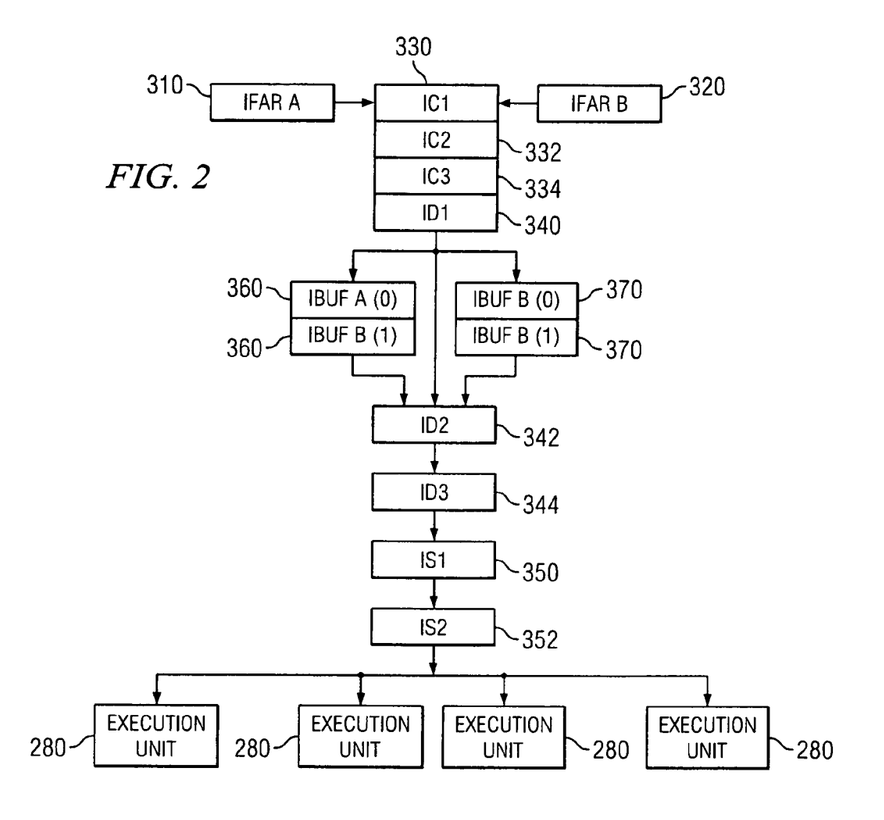
FIG. 2 includes a representation of instruction flow through a pipelined multi-threaded microprocessor.

Microprocessor 200 may be multi-threaded. A diagram of the flow of instructions through instruction unit 250 in a multi-threaded microprocessor which supports two threads is illustrated in FIG. 2. In order to facilitate implementation of various features of microprocessor 200, the flow of instructions through instruction unit 250 may be partitioned into a series of stages commonly know as pipelining. For purposes of this illustration, the two supported threads will be referred to as thread A and thread B.

Fetch unit 240 may maintain a separate instruction fetch address register (IFAR) 310, 320 for each thread. IFAR 310 indicates from where in instruction cache 260 instructions are to be fetched in conjunction with thread A, while IFAR 320 indicates from where in instruction cache 260 instructions are to be fetched in conjunction with thread B. Instructions are fetched alternately from the address indicated by IFAR 310 and the address indicated by IFAR 320. Typically, the fetch unit 210 provides instructions to instruction queue 220 by fetching four instructions from instruction cache 260 in one cycle. In some embodiments, instruction queue 220 holds 16 instructions, eight for each of thread A and thread B. For example, stage IC1 330 may contain four instructions fetched in accordance with thread A, stage IC2 332 may contain four instructions fetched according to thread B, stage IC3 334 four instructions associated with thread A, and stage ID1 340 four instructions of thread B. Instructions flow from instruction queue 260 to decode/dispatch unit 240. When instructions reach stage ID1 340 they are decoded and forwarded to stage ID2 342 for dispatch, or inserted into instruction buffers 360, 370. In some embodiments, each instruction buffer 360, 370 is configured to store two sets of four instructions per thread, and each buffer 360, 370 stores instructions for only one thread. For example, instruction buffer 360 may contain only instructions for thread A while instruction buffer 370 contains only instructions associated with thread B.

At stage ID2 342, an instruction for a thread may be dispatched. Logic within decode/dispatch unit 240 may determine which thread is executing during any given cycle. If there is an instruction available for a selected thread, and the thread is not blocked, then an instruction may be dispatched at stage ID2 342 for that thread. An instruction may available for a thread if there is a valid instruction in stage ID1 342 or in instruction buffer 360, 370 corresponding to that thread. After an instruction for a thread is dispatched in stage ID2 342 the instruction may proceed through the remainder of stages of the dispatch pipeline 344-350 until the instruction is issued at stage IS2 352 to the appropriate execution unit 280.

Figure 3:
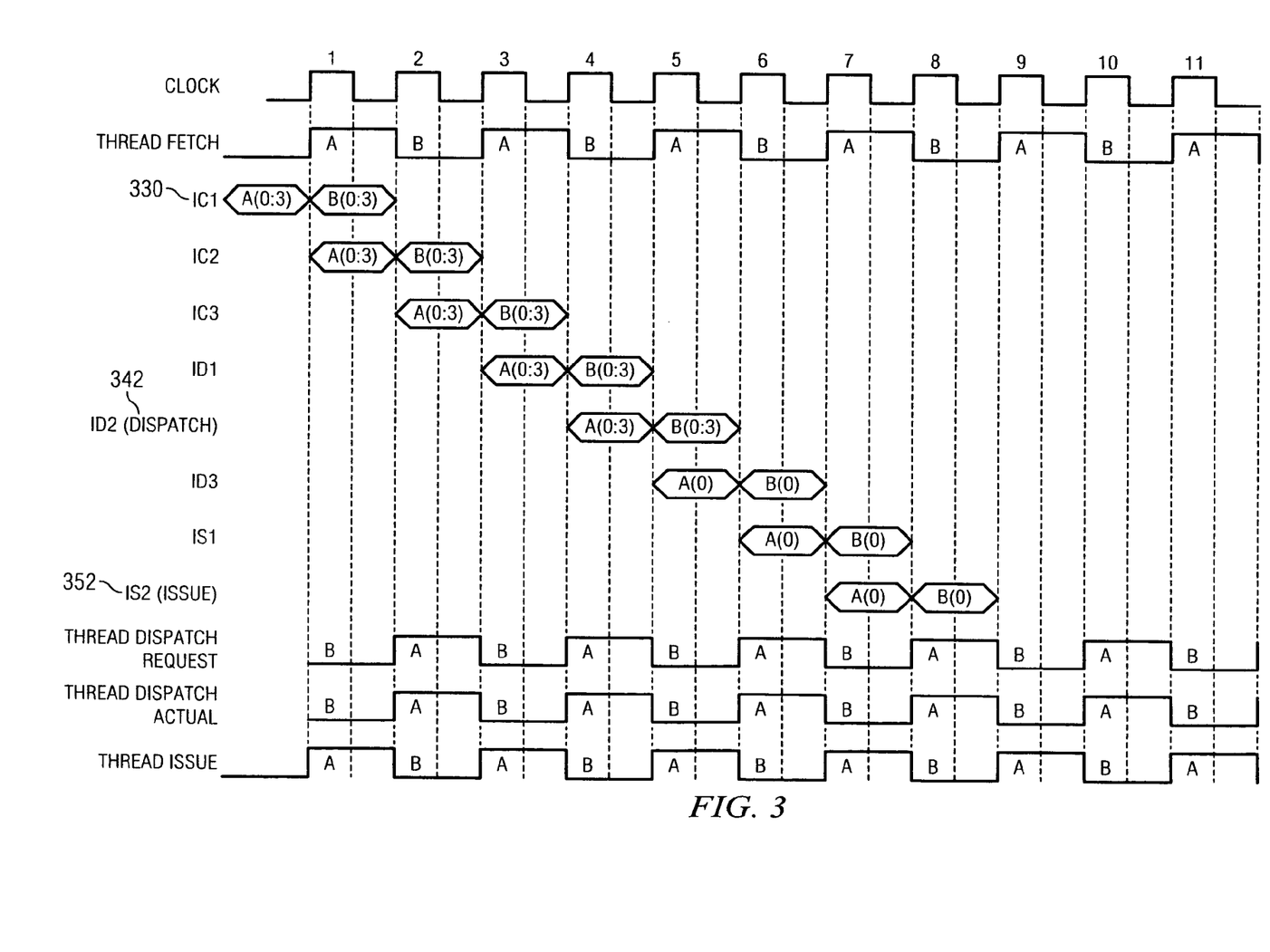
FIG. 3 includes a timing diagram of instruction flow through a pipelined multi-threaded microprocessor.

FIG. 3 depicts instruction flow through the pipeline stages depicted in FIG. 2, illustrating one example of the timing of a normal fetch, dispatch and issue of an instruction with no branch re-directs or pipeline stalls. In the example depicted, the fetch, dispatch and issue alternate between threads with every cycle. In stage IC1 330 four instructions are fetched for thread A. During the next cycle, four instructions for thread B are fetched in stage IC1 330. These instructions proceed through the pipeline, until eventually one of the instruction for thread A is dispatched at stage ID2 342 for eventual issue at stage IS2 352, followed by the dispatch of one instruction for thread B at stage ID2 342 and its issued at stage IS2 352. Those of ordinary skill in the art will realize that the pipeline and stages depicted in FIGS. 2 and 3 are exemplary only, and a wide variety of pipeline architectures may be implemented in accordance with microprocessor 200 and embodiments of the present invention.

In many cases, the set of instructions fetched from instruction cache 260 may comprise one or more branch instructions. To help mitigate the effects of the long pipeline which may occur in conjunction with a high frequency (or otherwise) microprocessor design, branch prediction mechanisms may be utilized. In each cycle, up to four instructions (e.g. per thread) may be fetched from instruction cache 260. Branch prediction logic in branch processing unit 230 scans the instructions (e.g. four instructions per thread) fetched from instruction cache 260 looking for branch instructions.

Depending upon the type of branch instructions found, various branch prediction mechanisms may be utilized by branch processing unit 230 to predict the branch direction or the target address of the branch or both. For example, all conditional branches may be predicted, even if the condition register bits upon which they are dependent are known at instruction fetch time.

In one embodiment, branch scan logic of branch processing unit 230 may look for a valid and possibly taken branch (e.g. a non-conditional branch or conditional branch predicted as taken) in the four instructions fetched from the instruction cache. If this branch scan logic finds a possibly taken branch instruction a target addresses may be computed and the instruction fetch unit 210 configured to perform a subsequent fetch from the address from the predicted target address. As branch instructions flow through the rest of the pipeline, and ultimately execute in the branch execution unit 280*a*, the actual outcome of the branches are determined. At that point, if the predictions were found to be correct, the branch instructions are simply completed like all other instructions. In the event that a prediction is found to be incorrect, the instruction fetch logic of fetch unit 210 may cause the mispredicted instructions (e.g. instructions on the predicted instruction stream) to be discarded or flushed and starts refetching instructions along the corrected path.

In one embodiment, the branch direction (e.g. taken or not-taken) is predicted for all four instructions fetched from instruction cache 260 in parallel using a valid instruction signal, a predecoded instruction signal or branch predictor information (e.g. branch history information) provided by a Branch History Table (BHT). In one embodiment, two branch prediction mechanisms (e.g. static branch prediction and dynamic branch prediction) may be applied to predict the branch direction for an instruction.

First a static branch prediction scheme may be applied. In one particular embodiment, a field of the conditional branch instruction code may provide an indicator of branch prediction. More specifically, when a programmer (or a compiler during compilation of a program) determines that a conditional branch instruction takes a particular branch direction (e.g. taken or not-taken) the majority of the time, this information may be embedded in the instruction (e.g. the 'at' field of an instruction in the PowerPC architecture) and used to determine the outcome of the branch prediction. In this case, if static branch prediction is utilized in conjunction with an instruction dynamic branch prediction logic may not be not used for that instruction.

Thus, this static branch prediction (e.g. analysis of the 'at' field of an instruction) may precedes any second type of branch prediction scheme. The second prediction scheme may, in one embodiment, be a dynamic branch prediction scheme. This type of dynamic branch prediction may be used to predict the direction of the branch by using a Branch History Table (BHT) with a two bit predictor. In one embodiment, the number of entries of the BHT may be 1K×4×2 bits for each thread. In one embodiment, a BHT for each thread can be read or written every cycle, where a read may comprise reading four one (or more) bit histories or writing one bit. The dynamic branch prediction scheme may, in some architectures, be disabled by clearing a BHT enable bit.

In one embodiment, to make branch scan logic faster (and hence branch prediction faster as well) two predecode bits (e.g. pd(1) and pd(2)) may be created and stored along with an instruction (e.g. a branch instruction) in instruction cache 260 or instruction queue 220. The meaning of the predecode bits to the branch prediction logic may, in one embodiment, be as follows:

| pd(1) | pd(2) | Definition |
|---|---|---|
| 0 | 1 | This is a conditional branch that the BHT is needed to predict the direction for (taken/not taken). |
| 1 | 1 | This is a branch that the branch scan logic should treat as unconditionally taken. |
| * | 0 | This is a non-branch or a branch that the branch scan logic should treat as unconditionally not taken. |

Figure 4:
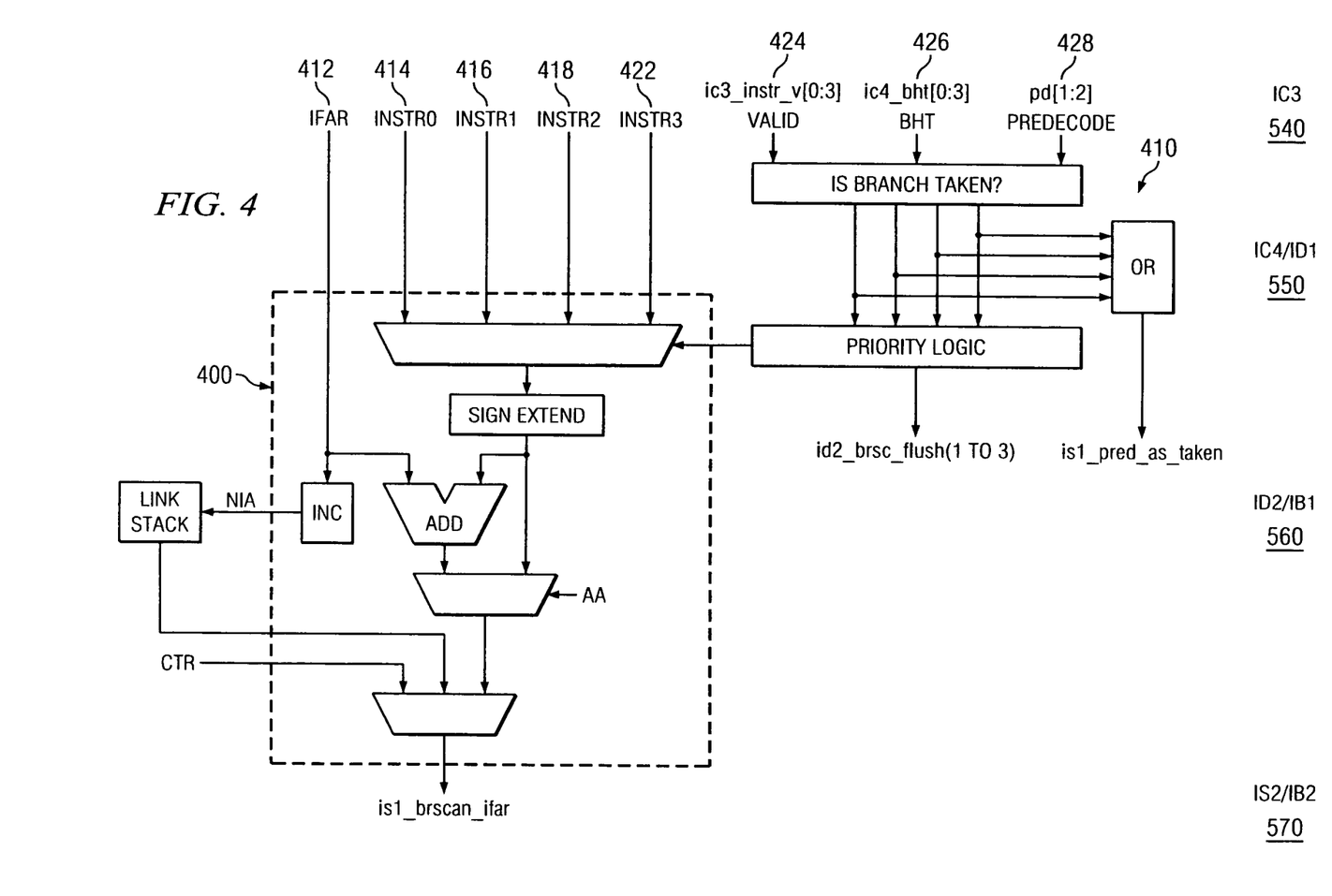
FIG. 4 depicts a block diagram of one embodiment of branch scan logic.

A block diagram of one embodiment of branch scan logic which may be used to scan for branch instructions and predict if the branch instruction is taken is depicted in FIG. 4. Logic 400 may be used for address calculation while logic 410 may be used for branch prediction (e.g. if instructions are taken or not-taken). Signal IFAR 412 may be from an Instruction Fetch Address Register (IFAR) (e.g. 310 or 320) and used for branch target address calculation for a relative branch where the calculation of the address is relative to the address of the branch instruction. Signals Instr0 414, instr1 416, instr2 418 and instr3 422 may carry information regarding each of the four instructions fetched during a particular cycle, including address information which may also be used for the address calculation. Valid signal 424 may be a four bit valid signal where each bit specifies if a corresponding instruction is valid or not. For example, if an instruction stream jumps to the address 0x4, the first instruction of the four instructions fetched in a cycle may be ignored. In this case, valid signal 424 may carry the following: signal valid(0)=0, valid(1)=valid(2)=valid(3)=1. Predictor signal 426 (e.g. BHT(0:3)) may comprise the strong part of a two bit branch predictor from a BHT which corresponds to one of the instruction fetched. Predecode signal 428 comprises four sets of two predecode bits as described above, each set corresponding to one of the four fetched instructions.

Figure 5A:
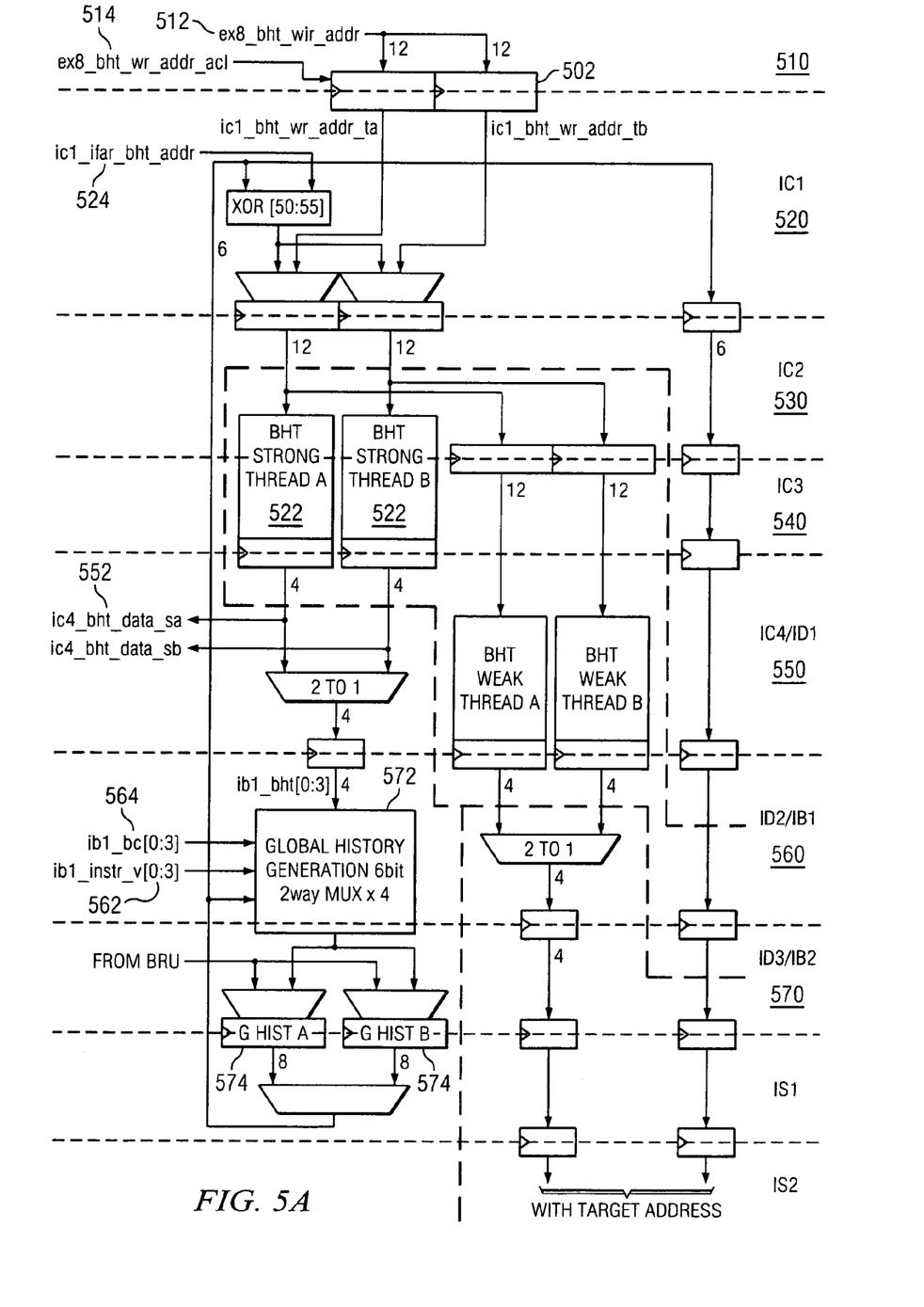
FIGS. 5A and 5B depict block diagrams of one embodiment the flow of data and logic for generation of a global history.
Figure 5B:
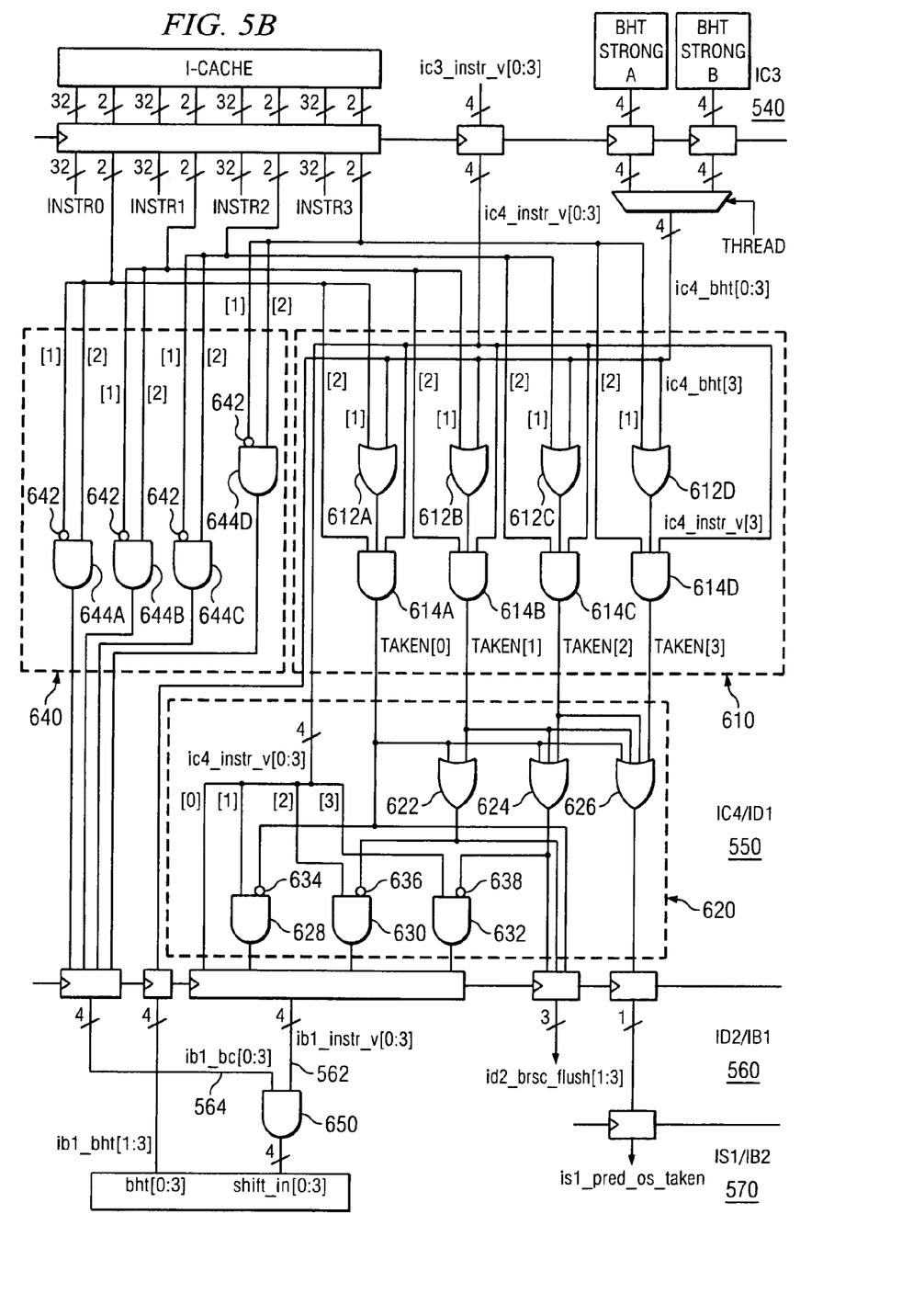

FIGS. 5A and 5B depict one embodiment of logic for implementing a data flow for a branch history table and associated global history generation. The embodiment depicted in FIGS. 5A and 5B may be used for a dual thread microprocessor architecture. For purposes of this description, however, the logic and data flow of the embodiment will be described solely with respect to a single thread (e.g. thread A), as the data flow may be substantially identical for each thread.

Referring first to FIG. 5A, in stage 510 line ex8_bht_wr_addr line 512 from the branch execution pipeline of branch execution unit 280a provides an address for BHT 522 update. In one embodiment, ex8_bht_wr_addr_act signal 514 is a latch activate signal. When this latch activate signal is asserted, register 502 may accumulate the input data from line ex8_bht_wr_addr 512.

Thus, in stage 520 an address for BHT 522 access is generated. In one embodiment, BHT 522 read and write are done every other clock cycle. For a BHT 522 read, the instruction fetch address (from lines ic1_ifar_bht_addr 524) is XORed (e.g. exclusive or logical operation) with the global history which comes from IC7 stage 580. For a BHT 522 write, the address generated in stage 510 may be used. This address is then presented to the BHT 522 in stage 530.

In stages 530 and 540, BHT 522 strong bits, which may be used for branch prediction by branch processing unit 230, are read. As four instructions (e.g. per thread) may be read in a clock cycle, four (or eight) bits from BHT 522 may be generated on a cycle as well (e.g. one BHT bit corresponding to each instruction fetched).

In one embodiment a two bit BHT predictor is generated by branch execution unit 280a using the result of branch execution. It is then sent to fetch unit 210 with ex8_bht_wr_addr line 512 and written as described above. The generated BHT 522 strong bits (e.g. one bit per instruction) may be sent to instruction fetch logic in fetch unit 210 (e.g. on line ic4_bht_data_sa 552 for one thread) in stage IC4 550. The generated BHT 522 bits are also sent to global history generation logic 562 in stage 560. While a data flow for a weak BHT table has been depicted with respect to FIG. 5, it will not be described in detail herein, however the weak BHT table may be used to generate a two bit branch predictor during a succeeding cycle.

Instruction fetch logic in fetch unit 210 may generate a valid instruction signal (e.g. ic3_instr_v[0:3]) each bit specifying if a corresponding instruction is valid or not (e.g. valid signal 424 as discussed above). Each bit of this valid signal (e.g. ic3_instr_v[0:3]) may indicate if a corresponding one of the four instructions fetched in a particular cycle meets certain conditions. One condition may be that the corresponding instruction is valid (e.g. the instruction should not be skipped, for example because an earlier branch instruction branches to a later address, etc.). For example, in one embodiment, the possible value of ic3_instr_v[0:3] are 0b0000, 0b1111, 0b0111, 0b0011, and 0b0001. When instruction fetch logic 210 fetches no valid instructions in a cycle, ic3_instr_v[0:3]= 0b0000. When all four instructions fetched are valid, ic3_instr_v[0:3]=0b1111, if the $1^{st}$ instruction is not valid and the $2^{nd}$ instruction is valid the value will be 0b0111, etc. For example an instruction stream branches to address 0x0004 (e.g. the 2nd instruction of four instructions fetched), ic3_instr_v[0:3]=0b0111. etc., as discussed above.

It can then be predicted if each of the instructions fetched in a cycle is taken by using the following logic: an instruction is deemed taken if it is valid AND (pd(1) OR BHT) AND pd(2) (e.g. the taken( ) signal referred to below). In other words, each instruction will be deemed as taken if the instruction is valid and either a first predecode bit or bits corresponding to the instruction from the BHT 522 (e.g. on ic4_bht_data_sa [0:3] 552) is set and a second predecode bit is set. One embodiment of logic for performing these operations is depicted in FIG. 5B. More specifically, logic 610 comprises sets 616 of OR gates 612 and AND gates 614, each set 616 operable to logically OR together a first instruction predecode bit corresponding to an instruction and a bit of a branch history for the instruction and logically AND the result with a second predecode bit corresponding to the instruction and a valid bit corresponding to the instruction (from a corresponding but of ic3_instr_v[0:3]) to produce the bit of the taken( ) singal corresponding with the instruction.

For each instruction then a taken signal may be generated. By using the taken signals for each of the four instructions a branch prediction signal on line ib1_instr_v[0:3] 562 corresponding to the four instructions may be generated. More specifically, in one embodiment signal ib1_instr_v[0:3] 562 may be generated to indicate whether one or more of the four instructions instruction has been predicted as taken and if so, which one, according to the following logic: ib1_instr_v[0:3]=ic3_instr_v[0] AND ic3_instr_v[1:3] AND NOT id2_brsc_flush[1:3]. Where id2_brsc_flush[1]=taken(0), id2_brsc_flush[2]=taken(0) OR taken(1), id2_brsc_flush[3]=taken(0) OR taken(1) OR taken(2). Put another way, on a bit by bit basis the ib1_instr_v[0:3] signal 562 may be expressed by the following logical expression: ib1_instr_v[0]=valid[0]; ib1_instr_v[1]=valid[1] AND NOT taken[0]; ib1_instr_v[2]=valid[2] AND NOT taken[0] AND NOT taken[1]; ib1_instr_v[3]=valid[2] AND NOT taken[0] AND NOT taken[1] AND NOT taken[2].

Referring to FIG. 5B, logic 620 may be operable to generate signal ib1_instr_v[0:3] comprising OR gates 622, 624 and 626, AND gates 628, 630 and 632 and inverters 634, 636 and 638, where OR gate 622 receives the output of AND gates 614a and 614b (e.g. taken[0] and taken[1]) OR gate 624 receives the output of AND gates 614a, 614b and 614c (e.g. taken[0], taken[1] and taken[2]) while OR gate 626 receives the output of AND gates 614a, 614b, 614c and 614d (e.g. taken[0], taken[1], taken [2] and taken[3]). AND gate 628 receives a bit of a branch prediction signal corresponding to a second instruction (of the four fetched) (e.g. ib1_instr_v[1] and the inverse of the output of AND gate 614a, AND gate 630 receives a bit of a branch prediction signal corresponding to a third instruction (of the four fetched) (e.g. ib1_instr_v[2] and the inverse of the output of OR gate 622 while AND gate 632 receives a bit of a branch prediction signal corresponding to a fourth instruction (of the four fetched) (e.g. ib1_instr_v[3] and the inverse of the output of OR gate 624.

In one embodiment a signal may also be generated from an instruction itself. More specifically, signal on line ib1_bc[0:3] 564 may be generated by using predecode bits of the four instructions fetched during the cycle (e.g. by the logical expression (NOT pd(0) AND pd(1)). Referring to FIG. 5B, logic 640 may be operable to accomplish the generation of such a signal. Specifically, each first predecode bit corresponding to an instruction may be inverted by inverter 642 and the inverse of the predecode bit provided to OR gate 644 along with a second predecode bit corresponding to the instruction. The output of OR gate 644 correspond to a bit of ib1_bc[0:3]. For example, OR gate 644a receives the inverse of a first predecode bit corresponding to a first instruction fetched and a second predecode bit corresponding to the same instruction. Thus the output of OR gate 644 may correspond to ib_1_bc[0].

Moving now to stages 560 and 570, the generation of global history occurs using bits generated from BHT 522, bits on signal line ib1_bc[0:3] 564 and bits on signal line ib1_instr_v[0:3] 562. The global history may be updated speculatively when the branch prediction is done (e.g. which may be at the end of stage 570). Global history logic 572 receives line ib_1_bc[0:3] 564 comprising four bits, each bit corresponding with one of the four instructions fetched in the cycle (which may be conditional branch instructions), and ib1_instr_v[0:3] 562 comprising four bits indicating whether each of the four instructions is valid, as discussed above. The global history generated by global history logic 572 may then be stored in global history register 574.

In one embodiment, the global history generated by global history logic 572 to be stored in global history register 574 is multiplexed with a set of signals from branch execution unit 280 such that if an instruction has been mispredicted the global history in global history register 574 may be flushed, or alternatively, a correct global history may be placed in global history register 574 (e.g. after it is generated by the branch execution unit 280).

As can be seen then, in microprocessors which are pipelined (or other types of microprocessors generally) it may be desired to quickly generate the global branch history such that substantial delays need not be introduced into the execution pipeline. However, the deeper the pipeline becomes and the larger amount of global history it is desired to generate, the more difficult generation of global history becomes. More specifically, it would be useful to be able to generate a global history which is wider than a single bit in a single clock cycle.

To that end, attention is now directed to systems, methods and apparatuses for the generation of a global history. Embodiments of the present invention may provide logic operable to generate a global history and a global history register operable to store a global history. More specifically, in one embodiment the global history logic comprises a set of multiplexers each set corresponding to one of a set of instructions fetched in a cycle of a microprocessor, the number of multiplexers in each set equal to the number of bits of global history and each multiplexer within a set having a select signal corresponding to the same instruction to which that set of multiplexers corresponds. The sets of multiplexers may be such that the set of multiplexers corresponding to the youngest instruction in the set of fetched instructions has a first multiplexer having one input from a branch history corresponding to the youngest instruction and another input from the first bit of the global history register, a second multiplexer having one input from the first bit of the global history register and a second input from a second bit of the global history register, etc. The set of multiplexers corresponding to the second youngest instruction has a first multiplexer having one input from a branch history corresponding to the second youngest instruction and another input from the first multiplexer of the set of multiplexers corresponding to the youngest instruction, a second multiplexer having one input from the output of the first multiplexer of the set of multiplexers corresponding to the youngest instruction and a second input from an output of the second multiplexer in the set of multiplexers corresponding to the youngest instruction, etc. In this manner the output of the set of multiplexers corresponding to the oldest (e.g. highest or lowest address) instruction in the set of instructions will be a generated global history which may be stored in the global history register.

Figure 6:
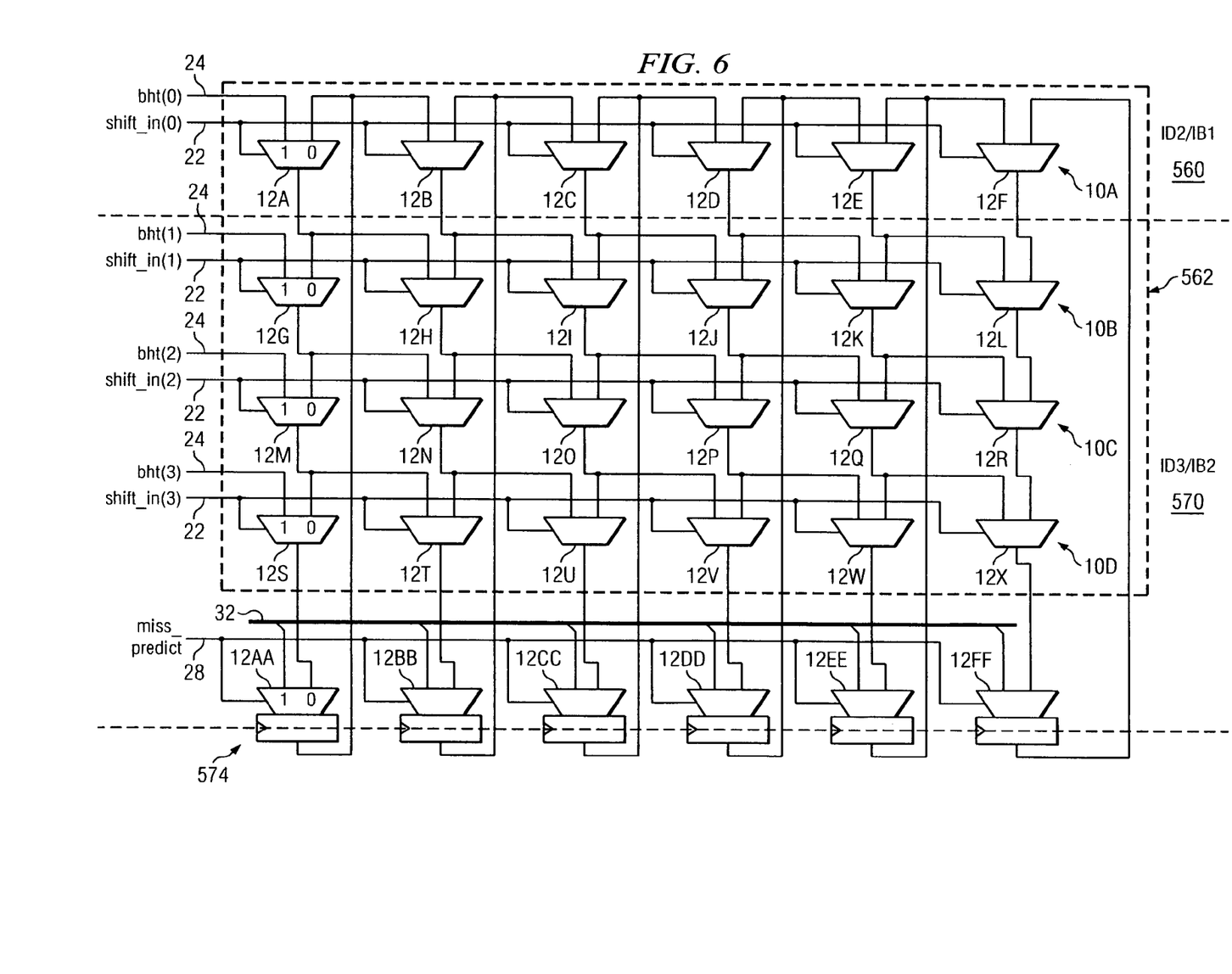
FIG. 6 depicts one embodiment of logic for the generation of global history.

One embodiment of the logic for the generation of global history is depicted in FIG. 6. Global history logic 572 may by configured to generate a six deep global history (e.g. six bits of global history) for a microprocessor architecture which fetches four instructions (e.g. for a thread) every instruction cycle. Global history logic 572 comprises four sets 10 of six two way multiplexers 12, each set 10 corresponding to one of the instructions fetched in a cycle. Thus, global history generation logic 562 may have set 10a of multiplexers 12a, 12b, 12c, 12d, 12e and 12f corresponding to one of the four instructions fetched in a cycle (which may, in one embodiment, be the first instruction of the four for execution e.g. the instruction with the lowest address, which may also be referred to as the youngest instruction); set 10b of multiplexers 12g, 12h, 12i, 12j, 12k and 12l corresponding to the second of the four instructions fetched in a cycle (which may, in one embodiment, be the second instruction of the four for execution e.g. the instruction with the second lowest address, which also may be referred to as the second youngest instruction); set 10c of multiplexers 12*m*, 12*n*, 12*o*, 12*p*, 12*q* and 12*r* corresponding to the third instructions fetched in a cycle and set 10*d* of multiplexers 12*s*, 12*t*, 12*u*, 12*v*, 12*w* and 12*x* corresponding to the fourth of the four instructions fetched in a cycle (which may again be the third and fourth instructions of the four fetched respectively).

The select signal of each of the multiplexers 12 in a set 10*a*, 10*b*, 10*c* and 10*d* is coupled to a bit of shift-in signal 22 corresponding to that set 10*a*, 10*b*, 10*c*, 10*d* of mulitplexers 12 (e.g. corresponding to the instruction which corresponds to that set of multiplexers). The first multiplexer 12*a*, 12*g*, 12*m* and 12*s* in each set 10*a*, 10*b*, 10*c*, 10*d* of multiplexers 12 may be coupled to a corresponding bit of the branch history received from branch history table on BHT signal line 24 (e.g. a strong bit from a branch history table that provides a history comprising a strong and weak bit, a single bit from a branch history table that provides only a single bit of history for an instruction, or any bit from a branch history table which it may be desired to enter into a global history).

In one embodiment, the bits of the shift-in[0:3] signal 22 are generated from the ib1_instr_v[0:3] and ib1_bc[0:3] signals 562, 564 by logic operable to implement the logical expression ib1_instr_v[0:3] AND ib1_bc[0:3] (e.g. shift-in [0] is generated by the logical operation ib1_instr_v[0] AND ifco_ib1_bc[0], etc.). Referring briefly back to FIG. 5B this operation may be accomplished by AND gate 650 operable to and corresponding bits of received signals ib1_bc[0:3] and ib1_instr_v[0:3] to generate shift_in[0:3] signal 22.

Moving back to FIG. 6, more specifically, one input of multiplexer 12*a* of set 10*a* is coupled to a corresponding bit of BHT signal 24 carrying bits from BHT 522 corresponding to a branch history for the instructions fetched during the cycle (e.g. a bit of the BHT signal 23 corresponding to the first instruction fetched), while the second input of multiplexer 12*a* may be coupled to a first bit of the register 574 holding a global history. Multiplexer 12*b* of set 10*a* takes one input from a first bit of the register 574 holding a global history and second input from a second bit of the register 574 holding a global history. Multiplexer 12*c* of set 10*a* takes one input from a second bit of the register 574 holding a global history and a second input from a third bit of the register 574 holding a global history. Multiplexer 12*d* of set 10*a* takes one input from a third bit of the register 574 holding a global history and a second input from a fourth bit of the register 574 holding a global history. Multiplexer 12*e* of set 10*a* takes one input from a fourth bit of the register 574 holding a global history and a second input from a fifth bit of the register 574 holding a global history. Multiplexer 12*f* of set 10*a* takes one input from a fifth bit of the register 574 holding a global history and a second input from a sixth bit the register 574 holding a global history.

In set 10*b*, multiplexer 12*g* is coupled to a corresponding bit of the BHT signal 24 (e.g. a bit of the BHT signal 24 corresponding to the second instruction fetched), while the second input of multiplexer 12*g* may be coupled to an output of multiplexer 12*a* of set 10*a*. Multiplexer 12*h* takes one input from the output of multiplexer 12*a* of set 10*a* and a second input from the output of multiplexer 12*b* of set 10*a*. Multiplexer 12*i* takes one input from the output of multiplexer 12*b* of set 10*a* and a second input from the output of multiplexer 12*c* of set 10*a*. Multiplexer 12*j* takes one input from the output of multiplexer 12*c* of set 10*a* and a second input from the output of multiplexer 12*d* of set 10*a*. Multiplexer 12*k* takes one input from the output of multiplexer 12*d* of set 10*a* and a second input from the output of multiplexer 12*e* of set 10*a*. Multiplexer 12*l* takes one input from the output of multiplexer 12*e* of set 10*a* and a second input from the output of multiplexer 12*f* of set 10*a*.

Set 10*c* is similar. Multiplexer 12*m* is coupled to a corresponding bit of the of the BHT signal 24 (e.g. a bit of the BHT signal 24 corresponding to the third instruction fetched), while the second input of multiplexer 12*m* may be coupled to an output of multiplexer 12*g* of set 10*b*. Multiplexer 12*n* takes one input from the output of multiplexer 12*g* of set 10*b* and a second input from the output of multiplexer 12*h* of set 10*b*. Multiplexer 12*o* takes one input from the output of multiplexer 12*h* of set 10*b* and a second input from the output of multiplexer 12*i* of set 10*b*. Multiplexer 12*p* takes one input from the output of multiplexer 12*i* of set 10*b* and a second input from the output of multiplexer 12*j* of set 10*b*. Multiplexer 12*q* takes one input from the output of multiplexer 12*j* of set 10*b* and a second input from the output of multiplexer 12*k* of set 10*b*. Multiplexer 12*r* takes one input from the output of multiplexer 12*k* of set 10*b* and a second input from the output of multiplexer 12*l* of set 10*b*.

Finally, in set 10*d*, multiplexer 12*s* is coupled to a corresponding bit of the of the BHT signal 24 (e.g. a bit of the BHT signal 24 corresponding to the fourth instruction fetched), while the second input of multiplexer 12*s* may be coupled to an output of multiplexer 12*m* of set 10*b*. Multiplexer 12*t* takes one input from the output of multiplexer 12*m* of set 10*b* and a second input from the output of multiplexer 12*n* of set 10*b*. Multiplexer 12*u* takes one input from the output of multiplexer 12*n* of set 10*b* and a second input from the output of multiplexer 12*o* of set 10*b*. Multiplexer 12*v* takes one input from the output of multiplexer 12*o* of set 10*b* and a second input from the output of multiplexer 12*p* of set 10*b*. Multiplexer 12*w* takes one input from the output of multiplexer 12*p* of set 10*b* and a second input from the output of multiplexer 12*q* of set 10*b*. Multiplexer 12*x* takes one input from the output of multiplexer 12*q* of set 10*b* and a second input from the output of multiplexer 12*r* of set 10*b*. Thus, global history logic 572 may generate one bit of the global history at the output of each of multiplexers 12*s*, 12*t*, 12*u*, 12*v*, 12*w* and 12*x* of set 10*d* to be stored in global history register 574. Thus, global history values for instructions may be produced by global history logic 572 and stored in global history register 574 based on values from the branch history table 522 and the validity of instructions fetched in a cycle.

This global history may be wrong, however, as the global branch history may be generated based upon the prediction of branch instructions. Thus, if upon execution of a branch instruction by branch execution unit 280 it is determined that a branch was mispredicted a pipeline flush may occur. In one embodiment, branch execution may be operable to determine that a branch has been mispredicted. In those cases branch execution unit 280 may generate a correct global history and a mispredict signal 28. Each bit of global history register 574 may be then be coupled to a corresponding multiplexer 12*aa*, 12*bb*, 12*cc*, 12*dd*, 12*ee*, 12*ff*, where the selector of each of these multiplexers 12*aa*, 12*bb*, 12*cc*, 12*dd*, 12*ee*, 12*ff* is coupled to mispredict signal 28 generated by branch execution unit 280. One input of each of multiplexers 12*aa*, 12*bb*, 12*cc*, 12*dd*, 12*ee*, 12*ff* may be from the output of multiplexers 12*s*, 12*t*, 12*u*, 12*v*, 12*w*, 12*x* respectively, and a signal line 32 which may carry a corresponding bit of global history which may be generated by branch execution unit 280.

Thus, if branch execution unit 280 detects a mispredicted branch instruction, a correct global history may be generated and placed on signal line 32 coupled to multiplexers 12*aa*, 12*bb*, 12*cc*, 12*dd*, 12*ee*, 12*ff*, branch prediction unit 280 may also assert mispredict signal 28 which configures multiplexers 12*aa*, 12*bb*, 12*cc*, 12*dd*, 12*ee*, 12*ff* to pass a bit of signal line 32 carrying the global history generated by branch execution unit 280 to global history register 574. Otherwise (e.g. mispredict 28 signal is not asserted) multiplexers 12*aa*, 12*bb*, 12*cc*, 12*dd*, 12*ee*, 12*ff* pass the signal on the input signal lines from 12*s*, 12*t*, 12*u*, 12*v*, 12*w*, 12*x* respectively, carrying the global history generated by global history logic 572 to global history register 574.

In the foregoing specification, the invention has been described with reference to specific embodiments. However, one of ordinary skill in the art appreciates that various modifications and changes can be made without departing from the scope of the invention as set forth in the claims below. For example, though embodiments of the present invention have been described with respect to particular example processor architectures it will be apparent that embodiments of the present invention may be equally applied to, and utilized with other processor architectures different than the examples utilized herein, such as those with different pipeline depths, different number of threads (greater or lesser), different number of instructions fetched per cycle, different types instruction set architectures, different methods of generating branch history, valid signals or shift-in signals, different depth (e.g. number of bits) of global history to be stored, etc. It will also be apparent that the particular embodiment of the invention to be utilized (e.g. number of sets of multiplexers, number of multiplexers in a set, etc.) will vary based upon the processor architecture with which it is utilized. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. An apparatus for generating a global history; comprising:
    a global history register operable to store a first set of bits; and
    global history generation logic operable to generate a set of global history bits, the global history logic comprising:
    a plurality of sets of multiplexers, each set of multiplexers corresponding to one of a set of instructions fetched during a cycle, wherein each multiplexer in a set of multiplexers has a select signal coupled to a bit of a shift_in signal corresponding to the one of the set of instructions to which the set of multiplexers corresponds, the plurality of sets of multiplexers including a first set of multiplexers comprising a first multiplexer having a first input coupled to a bit of a branch history signal corresponding to the one of the set of instructions to which the first set of multiplexers corresponds and a second input coupled to a first bit of the global history register, wherein the first set of multiplexers comprises at least one multiplexer wherein a first input of the at least one multiplexer is coupled to a second input of a previous multiplexer and the first set of multiplexers comprises a last multiplexer, having a first input coupled to a second input of a previous multiplexer and a second input coupled to a last bit of the global history register.

2. The apparatus of claim 1, wherein the bit of the branch history signal corresponds to a branch history generated for the one of the set of instructions to which the first set of multiplexers corresponds.

3. The apparatus of claim 2, wherein the value of the bit of the shift_in signal is based on whether the corresponding instruction is valid and if no previous instruction in the set of instructions is a taken branch and the corresponding instruction is a conditional branch.

4. The apparatus of claim 2, comprising a second set of multiplexers, each of the second set of multiplexers corresponding to one of the set of global history bits wherein one input of each multiplexer in the second set of multiplexers is a corresponding global history bit generated by the global history logic and a select signal of the multiplexer is a mispredict signal operable to indicate that a branch instruction has been mispredicted.

5. The apparatus of claim 4, wherein a second input of each of the multiplexers of the second set of multiplexers is a bit of a correct global history.

6. The apparatus of claim 5, wherein the correct global history is generated by a branch execution unit.

7. The apparatus of claim 3, wherein whether the corresponding instruction is valid and if any previous instruction in the set of instructions is a not taken branch is determined by logic, comprising:
    a first OR gate having a first input coupled to a first predecode bit corresponding to a first instruction of the set of instructions and a second input coupled to a first bit of a branch history corresponding to the first instruction;
    a first AND gate having a first input coupled to the second predecode bit corresponding to the first instruction, a second input coupled to the output of the first OR gate and a third input coupled to a first bit of a valid signal corresponding to the first instruction;
    a second OR gate having a first input coupled to a first predecode bit corresponding to a second instruction of the set of instructions and a second input coupled to a second bit of a branch history corresponding to the second instruction;
    a second AND gate having a first input coupled to the second predecode bit corresponding to the second instruction, a second input coupled to the output of the second OR gate and a third input coupled to a second bit of a valid signal corresponding to the second instruction;
    a third OR gate having a first input coupled to a first predecode bit corresponding to a third instruction of the set of instructions and a second input coupled to a third bit of a branch history corresponding to the third instruction;
    a third AND gate having a first input coupled to the second predecode bit corresponding to the third instruction, a second input coupled to the output of the third OR gate and a third input coupled to a third bit of a valid signal corresponding to the third instruction;
    a fourth OR gate having a first input coupled to an output of the first AND gate and a second input coupled to an output of the second AND gate;
    a fifth OR gate having a first input coupled to the output of the first AND, a second input coupled to the second AND gate and a third input coupled to an output of the third AND gate;
    a fourth AND gate having a first input coupled to the second bit of the valid signal corresponding to the second instruction and a second input coupled to an output of a first inverter, an input of the first inverter coupled to the output of the first AND gate;

a fifth AND gate having a first input coupled to the third bit of the valid signal corresponding to the third instruction and a second input coupled to an output of a second inverter, an input of the second inverter coupled to the output of the fifth OR gate;

a sixth AND gate having a first input coupled to a fourth bit of the valid signal corresponding to a fourth instruction of the set of instructions and a second input coupled to an output of a third invader, an input of the third inverter coupled to the output of the sixth OR gate.

8. The apparatus of claim 3, wherein whether the corresponding instruction is a conditional branch is determined by logic, comprising:

a seventh AND gate having a first input coupled to a second predecode bit corresponding to the first instruction and a second input coupled to the output of a fourth inverter, an input of the fourth inverter coupled to a first predecode bit corresponding to the first instruction;

an eighth AND gate having a first input coupled to a second predecode bit corresponding to the second instruction and a second input coupled to the output of a fifth inverter, an input of the fifth inverter coupled to a first predecode bit corresponding to the second instruction;

a ninth AND gate having a first input coupled to a second predecode bit corresponding to the third instruction and a second input coupled to the output of a sixth inverter, an input of the sixth inverter coupled to a first predecode bit corresponding to the third instruction; and a tenth AND gate having a first input coupled to a second predecode bit corresponding to the fourth instruction and a second input coupled to the output of a seventh inverter, an input of the seventh inverter coupled to a first predecode bit corresponding to the fourth instruction.

9. The apparatus of claim 8, wherein the shift_in signal is generated by logic, comprising:

an AND gate operable to logically and the output of the seventh AND gate and the first bit of the valid signal to produce a first bit of the shift_in signal, logically and the output of the eighth AND gate and the output of the fourth AND gate to produce a second bit of the shift_in signal, logically and the output of the ninth AND gate and the output of the fifth AND gate to produce a third bit of the shift_in signal and logically and the output of the tenth AND gate and the output of the sixth AND gate to produce a fourth bit of the shift_in signal.

10. A method for generating a global history; comprising: generating a set of global history bits; and storing the set of global history bits in a global history register operable to store a first set of bits, wherein the global history bits are generated by global history logic, comprising:

a plurality of sets of multiplexers, each set of multiplexers corresponding to one of a set of instructions fetched during a cycle, wherein each multiplexer in a set of multiplexers has a select signal coupled to a bit of a shift_in signal corresponding to the one of the set of instructions to which the set of multiplexers corresponds, the plurality of sets of multiplexers including a first set of multiplexers comprising a first multiplexer having a first input coupled to a first bit of a branch history signal corresponding to the one of the set of instructions to which the first set of multiplexers corresponds and a second input coupled to a first bit of the global history register wherein the first set of multiplexers comprises at least one multiplexer wherein a first input of the at least one multiplexer is coupled to a second input of a previous multiplexer, the first set of multiplexers comprises a last multiplexer, having a first input coupled to a first bit of a branch history signal corresponding to the one of the set of instructions to which the first set of multiplexers corresponds and a second input coupled to a last bit of the global history register, the first bit of the branch history signal corresponds to a branch history generated for the one of the set of instructions to which the first set of multiplexers corresponds and wherein a second set of multiplexers, each of the second set of multiplexers corresponding to one of the set of global history bits, wherein one input of each multiplexer is corresponding global history bit generated by the global history logic and a select signal of the multiplexer is a mispredict signal operable to indicate that a branch instruction has been mispredicted.

11. The method of claim 10, wherein a second input of each of the multiplexers of the second set of multiplexers is a bit of a correct global history.

12. The method of claim 11, wherein the correct global history is generated by a branch execution unit.

13. The method of claim 10, further comprising determining whether the corresponding instruction is valid and if any previous instruction in the set of instructions is a not taken branch using logic comprising:

a first OR gate having a first input coupled to a first predecode bit corresponding to a first instruction of the set of instructions and a second input coupled to a first bit of a branch history corresponding to the first instruction;

a first AND gate having a first input coupled to the second predecode bit corresponding to the first instruction, a second input coupled to the output of the first OR gate and a third input coupled to a first bit of a valid signal corresponding to the first instruction;

a second OR gate having a first input coupled to a first predecode bit corresponding to a second instruction of the set of instructions and a second input coupled to a second bit of a branch history corresponding to the second instruction;

a second AND gate having a first input coupled to the second predecode bit corresponding to the second instruction, a second input coupled to the output of the second OR gate and a third input coupled to a second bit of a valid signal corresponding to the second instruction;

a third OR gate having a first input coupled to a first predecode bit corresponding to a third instruction of the set of instructions and a second input coupled to a third bit of a branch history corresponding to the third instruction;

a third AND gate having a first input coupled to the second predecode bit corresponding to the third instruction, a second input coupled to the output of the third OR gate and a third input coupled to a third bit of a valid signal corresponding to the third instruction;

a fourth OR gate having a first input coupled to an output of the first AND gate and a second input coupled to an output of the second AND gate;

a fifth OR gate having a first input coupled to the output of the first AND, a second input coupled to the second AND gate and a third input coupled to an output of the third AND gate;

a fourth AND gate having a first input coupled to the second bit of the valid signal corresponding to the second instruction and a second input coupled to an output of a first inverter, an input of the first inverter coupled to the output of the first AND gate;

a fifth AND gate having a first input coupled to the third bit of the valid signal corresponding to the third instruction and a second input coupled to an output of a second inverter, an input of the second inverter coupled to the output of the fifth OR gate;

a sixth AND gate having a first input coupled to a fourth bit of the valid signal corresponding to a fourth instruction of the set of instructions and a second input coupled to an output of a third inverter, an input of the third inverter coupled to the output of the sixth OR gate.

14. The method of claim 10, further comprising determining whether the corresponding instruction is a conditional branch using logic comprising:

a seventh AND gate having a first input coupled to a second predecode bit corresponding to the first instruction and a second input coupled to the output of a fourth inverter, an input of the fourth inverter coupled to a first predecode bit corresponding to the first instruction;

an eighth AND gate having a first input coupled to a second predecode bit corresponding to the second instruction and a second input coupled to the output of a fifth inverter, an input of the fifth inverter coupled to a first predecode bit corresponding to the second instruction;

a ninth AND gate having a first input coupled to a second predecode bit corresponding to the third instruction and a second input coupled to the output of a sixth inverter, an input of the sixth inverter coupled to a first predecode bit corresponding to the third instruction; and a tenth AND gate having a first input coupled to a second predecode bit corresponding to the fourth instruction and a second input coupled to the output of a seventh inverter, an input of the seventh inverter coupled to a first predecode bit corresponding to the fourth instruction.

15. The method of claim 14, further comprising determining the shift_in signal using logic comprising:

an AND gate operable to logically and the output of the seventh AND gate and the first bit of the valid signal to produce a first bit of the shift_in signal, logically and the output of the eighth AND gate and the output of the fourth AND gate to produce a second bit of the shift_in signal, logically and the output of the ninth AND gate and the output of the fifth AND gate to produce a third bit of the shift_in signal and logically and the output of the tenth AND gate and the output of the sixth AND gate to produce a fourth bit of the shift_in signal.

16. A system, comprising:

an instruction fetch unit operable to fetch a set of instructions;

a branch history table operable to generate a branch history bit for each of the set of instructions;

logic operable to generate a shift-in signal, the shift_in signal comprising a set of shift_in bits, each shift_in bit corresponding to one of the set of instructions;

a global history register operable to store a first set of bits; and global history generation logic operable to generate a set of global history bits, the global history logic comprising:

a plurality of sets of multiplexers, each set of multiplexers corresponding to one of the set of instructions, wherein each multiplexer in a set of multiplexers has a select signal coupled to the bit of the shift_in signal corresponding to the one of the set of instructions, the plurality of sets of multiplexers including a first set of multiplexers comprising a first multiplexer having a first input coupled to the branch history bit corresponding to the one of the set of instructions to which the first set of multiplexers corresponds and a second input coupled to a first bit of the global history register, the first set of multiplexers comprises at least one second multiplexer wherein a first input of the at least one second multiplexer is coupled to a second input of a previous multiplexer, the first set of multiplexers comprises a last multiplexer, having a first input coupled to a second input of one of the at least one second multiplexers and a second input coupled to a last bit of the global history register wherein the first bit of the branch history signal corresponds to a branch history generated for the one of the set of instructions to which the first set of multiplexers corresponds, and wherein a second set of multiplexers, each of the second set of multiplexers corresponding to one of the set of global history bits wherein one input of each multiplexer is corresponding global history bit generated by the global history logic and a select signal of the multiplexer is a mispredict signal operable to indicate that a branch instruction has been mispredicted.

17. The system of claim 16, wherein a second input of each of the multiplexers of the second set of multiplexers is a bit of a correct global history.

18. The system of claim 17, wherein the correct global history is generated by a branch execution unit.

19. A system, comprising:

an instruction fetch unit operable to fetch a set of instructions;

a branch history table a operable to generate a branch history bit for each of the set of instructions;

logic a operable to generate a shift-in signal, the shift_in signal comprising a set of shift_in bits, each shift_in bit corresponding to one of the set of instructions;

a global history register operable to store a first set of bits; and global history generation logic operable to generate a set of global history bits, the global history logic comprising:

a plurality of sets of multiplexers, each set of multiplexers corresponding to one of the set of instructions, wherein each multiplexer in a set of multiplexers has a select signal coupled to the bit of the shift_in signal corresponding to the one of the set of instructions, the plurality of sets of multiplexers including a first set of multiplexers comprising a first multiplexer having a first input coupled to the branch history bit corresponding to the one of the set of instructions to which the first set of multiplexers corresponds and a second input coupled to a first bit of the global history register, the first set of multiplexers comprises at least one second multiplexer wherein a first input of the at least one second multiplexer is coupled to a second input of a previous multiplexer, the first set of multiplexers comprises a last multiplexer, having a first input coupled to a second input of one of the at least one second multiplexers and a second input coupled to a last bit of the global history register wherein the first bit of the branch history signal corresponds to a branch history generated for the one of the set of instructions to which the first set of multiplexers corresponds and the value of the bit of the shift_in signal is based on whether the corresponding instruction is valid and if no previous instruction in the set of instructions is a taken branch and the corresponding instruction is a conditional branch and wherein whether the corresponding instruction is valid and if any previous instruction in the set of instructions is a not taken branch is determined by logic, comprising;

a first OR gate having a first input coupled to a first predecode bit corresponding to a first instruction of the set of instructions and a second input coupled to a first bit of a branch history corresponding to the first instruction;

a first AND gate having a first input coupled to the second predecode bit corresponding to the first instruction, a second input coupled to the output of the first OR gate and a third input coupled to a first bit of a valid signal corresponding to the first instruction;

a second OR gate having a first input coupled to a first predecode bit corresponding to a second instruction of the set of instructions and a second input coupled to a second bit of a branch history corresponding to the second instruction;

a second AND gate having a first input coupled to the second predecode bit corresponding to the second instruction, a second input coupled to the output of the second OR gate and a third input coupled to a second bit of a valid signal corresponding to the second instruction;

a third OR gate having a first input coupled to a first predecode bit corresponding to a third instruction of the set of instructions and a second input coupled to a third bit of a branch history corresponding to the third instruction;

a third AND gate having a first input coupled to the second predecode bit corresponding to the third instruction, a second input coupled to the output of the third OR gate and a third input coupled to a third bit of a valid signal corresponding to the third instruction;

a fourth OR gate having a first input coupled to an output of the first AND gate and a second input coupled to an output of the second AND gate;

a fifth OR gate having a first input coupled to the output of the first AND, a second input coupled to the second AND gate and a third input coupled to an output of the third AND gate;

a fourth AND gate having a first input coupled to the second bit of the valid signal corresponding to the second instruction and a second input coupled to an output of a first inverter, an input of the first inverter coupled to the output of the first AND gate;

a fifth AND gate having a first input coupled to the third bit of the valid signal corresponding to the third instruction and a second input coupled to an output of a second inverter, an input of the second inverter coupled to the output of the fifth OR gate;

a sixth AND gate having a first input coupled to a fourth bit of the valid signal corresponding to a fourth instruction of the set of instructions and a second input coupled to an output of a third inverter, an input of the third inverter coupled to the output of the sixth OR gate.

20. A system, comprising:

an instruction fetch unit operable to fetch a set of instructions;

a branch history table operable to generate a branch history bit for each of the set of instructions;

logic operable to generate a shift-in signal the shift_in signal comprising a set of shift_in bits each shift_in bit corresponding to one of the set of instructions;

a global history register operable to store a first set of bits; and global history generation logic operable to generate a set of global history bits, the global history logic comprising:

a plurality of sets of multiplexers, each set of multiplexers corresponding to one of the set of instructions, wherein each multiplexer in a set of multiplexers has a select signal coupled to the bit of the shift_in signal corresponding to the one of the set of instructions, the plurality of sets of multiplexers including a first set of multiplexers comprising a first multiplexer having a first input coupled to the branch history bit corresponding to the one of the set of instructions to which the first set of multiplexers corresponds and a second input coupled to a first bit of the global history register, the first set of multiplexers comprises at least one second multiplexer wherein a first input of the at least one second multiplexer is coupled to a second input of a previous multiplexer, the first set of multiplexers comprises a last multiplexer, having a first input coupled to a second input of one of the at least one second multiplexers and a second input coupled to a last bit of the global history register wherein the first bit of the branch history signal corresponds to a branch history generated for the one of the set of instructions to which the first set of multiplexers corresponds and the value of the bit of the shift_in signal is based on whether the corresponding instruction is valid and if no previous instruction in the set of instructions is a taken branch and the corresponding instruction is a conditional branch and wherein whether the corresponding instruction is a conditional branch is determined by logic, comprising:

a seventh AND gate having a first input coupled to a second predecode bit corresponding to the first instruction and a second input coupled to the output of a fourth inverter, an input of the fourth inverter coupled to a first predecode bit corresponding to the first instruction;

an eighth AND gate having a first input coupled to a second predecode bit corresponding to the second instruction and a second input coupled to the output of a fifth inverter, an input of the fifth inverter coupled to a first predecode bit corresponding to the second instruction;

a ninth AND gate having a first input coupled to a second predecode bit corresponding to the third instruction and a second input coupled to the output of a sixth inverter, an input of the sixth inverter coupled to a first predecode bit corresponding to the third instruction; and a tenth AND gate having a first input coupled to a second predecode bit corresponding to the fourth instruction and a second input coupled to the output of a seventh inverter, an input of the seventh inverter coupled to a first predecode bit corresponding to the fourth instruction.

21. The system of claim 20, wherein the shift_in signal is generated by logic, comprising:

an AND gate operable to logically and the output of the seventh AND gate and the first bit of the valid signal to produce a first bit of the shift_in signal, logically and the output of the eighth AND gate and the output of the fourth AND gate to produce a second bit of the shift_in signal, logically and the output of the ninth AND gate and the output of the fifth AND gate to produce a third bit of the shift_in signal and logically and the output of the tenth AND gate and the output of the sixth AND gate to produce a fourth bit of the shift_in signal.

22. An apparatus for generating a global history; comprising:

a global history register operable to store a first set of bits; and global history generation logic operable to generate a set of global history bits, the global history logic comprising:

a plurality of sets of multiplexers, each set of multiplexers corresponding to one of a set of instructions fetched during a cycle, wherein each multiplexer in a set of multiplexers has a select signal coupled to a bit of a signal line corresponding to the one of the set of instructions to which the set of multiplexers corresponds, the plurality of sets of multiplexers including:

a first set of multiplexers, comprising:

a first multiplexer having a first input coupled to a first bit of a branch history signal corresponding to the one of the set of instructions to which the first set of multiplexers corresponds and a second input coupled to a first bit of the global history register, and a second multiplexer having a first input coupled to a first bit of the global history register and a second input coupled to a second bit of the global history register; and a second set of multiplexers, comprising:

a first multiplexer having a first input coupled to a second bit of a branch history signal corresponding to the one of the set of instructions to which the second set of multiplexers corresponds and a second input coupled to the output of the first multiplexer of the first set of multiplexers, and a second multiplexer having a first input coupled to the output of the first multiplexer of the first set of multiplexers and a second input coupled to the output of the second multiplexer of the first set of multiplexers.

* * * * *